US011880433B2

(12) United States Patent
Antonioli et al.

(10) Patent No.: US 11,880,433 B2
(45) Date of Patent: Jan. 23, 2024

(54) BLOCKCHAIN-BASED AUTHENTICATION OF ARTWORK

(71) Applicant: Collectory S.á r.l., Luxembourg (LU)

(72) Inventors: Alberto Antonioli, Monza e della Brianza (IT); Pierluigi Zagari, Luxembourg (LU)

(73) Assignee: Collectory S.a r.l., Luxembourg (LU)

( * ) Notice: Subject to any disclaimer, the term of this patent is extended or adjusted under 35 U.S.C. 154(b) by 267 days.

(21) Appl. No.: 17/576,793

(22) Filed: Jan. 14, 2022

(65) Prior Publication Data

US 2023/0229742 A1  Jul. 20, 2023

(51) Int. Cl.
*G06F 21/10* (2013.01)
*H04L 9/32* (2006.01)
*H04L 9/00* (2022.01)

(52) U.S. Cl.
CPC .............. *G06F 21/10* (2013.01); *H04L 9/321* (2013.01); *H04L 9/3236* (2013.01); *H04L 9/50* (2022.05)

(58) Field of Classification Search
CPC . G06F 21/10; H04L 9/50; H04L 9/321; H04L 9/3237
See application file for complete search history.

(56) References Cited

U.S. PATENT DOCUMENTS

| 11,329,804 | B2 * | 5/2022 | Butters | H04L 9/0866 |
| 2013/0173484 | A1 * | 7/2013 | Wesby | G06K 7/1417 |
| | | | | 705/318 |
| 2021/0035246 | A1 * | 2/2021 | Schouppe | H04L 9/50 |

FOREIGN PATENT DOCUMENTS

EP  3 340 213 A1  6/2018

OTHER PUBLICATIONS

Jovic Milica: "Art & Technology: How to Use Blockchain to Authenticate Art?", Jul. 2, 2018 (Jul. 2, 2018), XP055975708, Retrieved from the Internet: URL:https://www.artacacia.com/blogs/posts/art-technology-how-to-use-blockchain-to-authenticate-art [retrieved on Oct. 27, 2022] the whole document.

Pawan Kumar et al.: "Future prospects of luminescent nanomaterial based security inks: from synthesis to anti-counterfeiting applications", Nanoscale, vol. 8, No. 30, Jun. 23, 2016 (Jun. 23, 2016), pp. 14297-14340, XP055382820, United Kingdom ISSN: 2040-3364, DOI: 10.I039/C5NR06965C abstract Introduction, Section 3, Conclusion.

* cited by examiner

*Primary Examiner* — Nicholas P Celani
(74) *Attorney, Agent, or Firm* — Foley & Lardner LLP

(57) ABSTRACT

A system and method for linking authentication documents to a piece of artwork using blockchain. The method includes maintaining a blockchain with a plurality of computing devices; obtaining one or more documents comprising data corresponding to a piece of artwork; generating a document hash for each of the one or more documents based on text contained in the respective documents; generating a frequency hash based on a light wave frequency; appending a block instance to the blockchain by generating a block address based on the document hashes for the one or more documents, the frequency hash, and an identification of the piece of artwork; and transmitting instructions to a seal coating device, receipt of the instructions causing the seal coating device to apply a seal coating to the piece of artwork and a certificate containing the document hashes for the one or more documents.

20 Claims, 6 Drawing Sheets

BLOCKCHAIN-BASED AUTHENTICATION OF ARTWORK

BACKGROUND

In the artwork industry, it can be difficult to determine which pieces of artwork are authentic and whether the authentication documents for the artwork are authentic themselves. For example, if an art retailer wishes to determine whether a particular piece of artwork is authentic or is a counterfeit before purchasing the art from a wholesaler, the art retailer may have to rely on documents that the wholesaler provides. While such documents on their face may appear to be reliable and accurate, such documents may be easily spoofed. The possibility of forging the authentication documents can call into question the entire art industry as it can be difficult to tell which pieces of artwork and the documents authenticating such artwork are originals. The problem increases as technology improves and enables spoofers to produce more facially authentic pieces of artwork and authentication documents.

SUMMARY

Aspects of example embodiments of the present disclosure relate generally to providing a blockchain-based method of authenticating a piece of artwork. Documents about the piece of artwork may be curated using one or more designated "verifiers" on an online verification platform to identify documents that indicate a piece of artwork is authentic (e.g., not a counterfeit). The documents may be uploaded to an authentication system, which can extract the data within the documents and create hashes of the documents. The hashes may be appended to a blockchain in a block instance with a hash of a light wave frequency. The system may then generate a physical certificate that includes the hashes of the documents. The system may apply a seal coating to both the piece of artwork and the physical certificate that only appears if a light with the light wave frequency is directed to the seal. The system may do so by applying the coating to the artwork using a tamper proof, clear, security label that is removable and does not introduce any new chemicals to the artwork itself. Thus, if a user wishes to confirm the authenticity of a particular piece of artwork, the user can first confirm the same light wave frequency can be used to view the seal coating on the artwork and the certificate. The user may then confirm the certificate's accuracy by retrieving and viewing the documents identified by their respective hashes on the certificate. Because the document hashes and the frequency are both stored on the blockchain, the user can be assured that the documents have not been tampered with or spoofed by recalculating the hashes and making sure the recalculated hashes match the hashes on the blockchain. Thus, a system implementing the systems and methods described herein can assure art sellers and buyers that the art that they are selling is authentic.

In accordance with some embodiments of the present disclosure, a method for linking authentication documents to a piece of artwork using blockchain. The method may include maintaining, by one or more processors, a blockchain with a plurality of computing devices; obtaining, by the one or more processors, one or more documents comprising data corresponding to a piece of artwork; generating, by the one or more processors, a document hash for each of the one or more documents (or a hash of multiple document hashes) based on text contained in the respective documents; generating, by the one or more processors, a frequency hash based on a light wave frequency; appending, by the one or more processors, a block instance to the blockchain by generating a block address based on the document hashes for the one or more documents, the frequency hash, and an identification of the piece of artwork; and transmitting, by the one or more processors, instructions to a seal coating device, receipt of the instructions causing the seal coating device to apply a seal coating to the piece of artwork and a certificate containing the document hashes for the one or more documents, the seal coating configured to appear only when light having the light wave frequency of the frequency hash is directed at the seal coating. In some embodiments, the method includes generating, by the one or more processors, a smart contract exhaustive of all of the document hashes.

In some embodiments, the certificate includes an identification code for the piece of artwork. The identification code for the piece of artwork may include two random 4-digit sequences (e.g., xxxx-yyyy). Each sequence may be a Fibonacci number. The method may include generating, by the one or more processors, the identification code for the piece of artwork. Generating the identification code may comprise generating, by the one or more processors, the identification code such that the first sequence includes an identifier of the collector (e.g., the owner of the piece of artwork) and may be the same across all pieces of artwork that the collector owns. The second sequence may include a number that is specific to the artwork and changes between pieces of artwork.

In accordance with some other embodiments of the present disclosure, a system for linking authentication documents to a piece of artwork using blockchain is disclosed. The system may include a processor coupled to a memory having programmed instructions, wherein upon executing the programmed instructions, the processor maintains a blockchain with a plurality of computing devices; obtains one or more documents comprising data corresponding to a piece of artwork; generates a document hash for each of the one or more documents based on text contained in the respective documents; generates a frequency hash based on a light wave frequency; and appends a block instance to the blockchain by generating a block address based on the document hashes for the one or more documents, the frequency hash, and an identification of the piece of artwork; and transmits instructions to a seal coating device, receipt of the instructions causing the seal coating device to apply a seal coating to the piece of artwork and a certificate containing the document hashes for the one or more documents, the seal coating configured to appear only when light having the light wave frequency of the frequency hash is directed at the seal coating.

In accordance with yet other embodiments of the present disclosure, A non-transitory computer-readable storage medium storing executable instructions that, when executed by one or more processors, causes the one or more processors to link authentication documents to a piece of artwork using blockchain, the instructions comprising instructions to maintain a blockchain with a plurality of computing devices; obtain one or more documents comprising data corresponding to a piece of artwork; generate a document hash for each of the one or more documents based on text contained in the respective documents; generate a frequency hash based on a light wave frequency; append a block instance to the blockchain by generating a block address based on the document hashes for the one or more documents, the frequency hash, and an identification of the piece of artwork; and control a seal coating device to cause the seal coating device to apply a seal coating to the piece of artwork and a certificate containing the document hashes for the one or more documents, the seal coating configured to appear only when light having the light wave frequency of the frequency hash is directed at the seal coating.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

Figure 1:
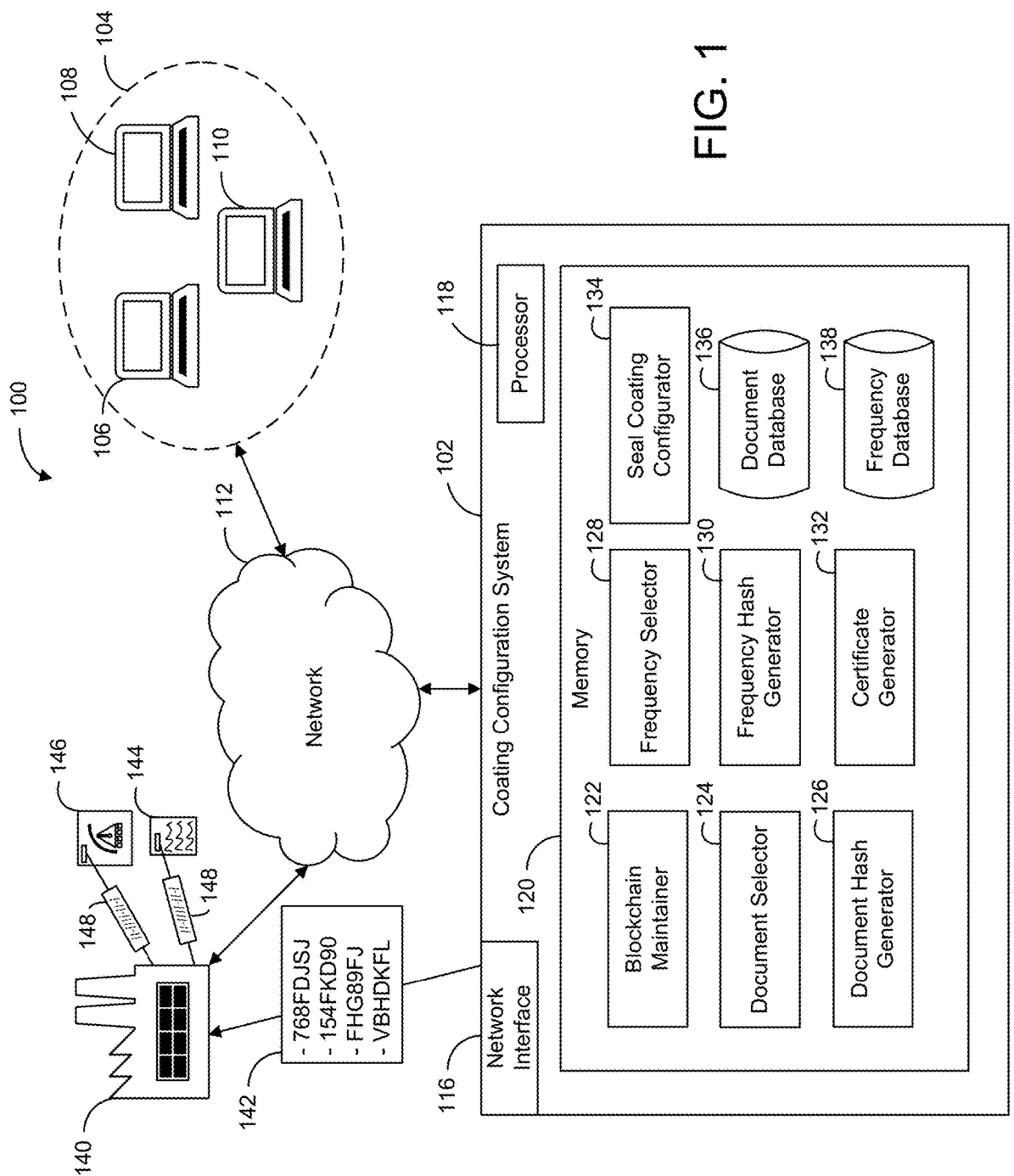
FIG. 1 is an illustration of an example artwork authentication system, in accordance with some embodiments.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

It will be readily understood that the aspects of the present disclosure, as generally described herein, and illustrated in the figures, can be arranged, substituted, combined, and designed in a wide variety of different configurations, all of which are explicitly contemplated and made part of this disclosure.

As previously mentioned, it can be difficult to determine which pieces of artwork are authentic and whether the authentication documents for the artwork are authentic themselves. While authentication documents on their face may appear to be reliable and accurate, such documents may be easily spoofed (e.g., forged). For example, it may be easy to create a fake invoice for a piece of artwork that indicates an art seller purchased the artwork from the artwork's creator. Given the current state of computer technology, individuals may simply create and/or use a printer that matches the formatting of such invoices and pass them off to the art sellers (e.g., an individual may easily recreate invoices in text documents and any watermarks that are typically on such documents). Without any method of checking with the artists, the art sellers are often left to rely on the invoices themselves and use art authenticators who may visually inspect the art to confirm the artwork's authenticity. Such functions are subject to human error, however, and often leave authentication systems prone to spoofers who can create replicas of pieces of artwork and can simply print off their own invoices and other authentication documents to authenticate the replicas. Thus, there is a need for a secure method of authenticating pieces of artwork.

Implementations of the systems and methods discussed herein overcome these technical deficiencies using a blockchain infrastructure and seal coating technology. A computer may host a document data room that contains authentication documents for different pieces of artwork. The computer may provide access to the data room to different user accounts to enable users of the user accounts to view the authentication documents and input indications (e.g., positive or negative indications) of whether they believe the authentication documents are real or counterfeits. The computer may retrieve and analyze the indications and select the authentication documents that the computer determines satisfy selection criteria (e.g., a number of positive indications above a threshold). Thus, the computer may use a crowdsourcing data room to determine which documents accurately authenticate a piece of artwork.

After selecting the authentication documents, the computer may store the documents using blockchain technology to ensure they cannot be tampered with. Storage of documents may be realized through a cloud server (e.g., AMAZON WEB SERVICES (AWS)). For example, the computer may extract the text from each of the documents and create a hash from the text. The computer may then store the documents in a secure database (e.g., an encrypted database on a local server or a cloud server) and append a block instance containing the hashes and an identifier of the piece of artwork (e.g., document identification number as described above) that the documents authenticate to a blockchain. The document database may contain stored relationships between the documents and their respective hashes such that a user seeking to authenticate the artwork may identify the documents from the hashes on the blockchain. In this way, the computer may create immutable authentication documents. If any user seeks to change or create fake authentication documents, an authenticator may calculate the hash of the new documents. If the hashes do not match, the authenticator can determine the authentication documents and the artwork are not authentic.

Finally, to verify that the authentication documents stored on the blockchain correspond to a particular piece of artwork, the computer can configure a seal coating for the artwork and a certificate identifying the authentication documents for the artwork. For example, the computer may create a physical certificate that contains the hashes of the authentication documents for the artwork. The computer may also create a seal coating configuration for a seal coating such that the seal coating only appears if a light having a wave frequency that is specific to the artwork and the certificate is directed at the seal. The computer may transmit instructions containing the configuration of the seal coating to a seal coating device to cause the seal coating device to apply a seal coating having the light wave frequency characteristics. The computer may create a hash of the light wave frequency and store the hash in the same block instance as the document hashes. Because the light wave frequency may be unique to the piece of artwork and certificate, an authenticator can confirm the certificate and artwork are correlated with each other. The link between the artwork and the certificate, along with the immutability of the document and light wave frequency on the blockchain, may enable artwork authenticators to be able to confirm the authenticity of artwork without manually reviewing individual brushstrokes of different pieces of art and without having to worry about art and document spoofers.

Referring now to FIG. 1, an illustration of an example artwork authentication system 100 is shown, in some embodiments. In brief overview, system 100 can include a coating configuration system 102, a set 104 of client devices 106, 108, and 110 that communicate with coating configuration system 102 over a network 112, and a manufacturing system 114. These components may operate together to apply unique coatings to pieces of artwork to authenticate the artwork. System 100 may include more, fewer, or different components than shown in FIG. 1. For example, there may be any number of client devices or computers that make up or are a part of coating configuration system 102 or set 104 or networks in system 100.

Client devices 106, 108, and 110 and/or coating configuration system 102 can include or execute on one or more processors or computing devices and/or communicate via network 112. Network 112 can include computer networks such as the Internet, local, wide, metro, or other area networks, intranets, satellite networks, and other communication networks such as voice or data mobile telephone networks. Network 112 can be used to access information resources such as web pages, websites, domain names, or uniform resource locators that can be presented, output, rendered, or displayed on at least one computing device (e.g., client devices 106, 108, and 110), such as a laptop, desktop, tablet, personal digital assistant, smartphone, portable computers, or speaker. For example, via network 112, client devices 106, 108, and 110 can maintain a blockchain with coating configuration system 102 that contains authentication data for various pieces of artwork.

Each of client devices 106, 108, and 110 and/or coating configuration system 102 can include or utilize at least one processing unit or other logic devices such as a programmable logic array engine or a module configured to communicate with one another or other resources or databases. The components of client devices 106, 108, and 110 and/or coating configuration system 102 can be separate components or a single component. System 100 and its components can include hardware elements, such as one or more processors, logic devices, or circuits.

Coating configuration system 102 may comprise one or more processors that are configured to maintain artwork authentication documents and light wave frequencies. Coating configuration system 102 may configure seal coatings that can be used to link the authentication documents with the artwork. Coating configuration system 102 may comprise a network interface 116, a processor 118, and/or memory 120. Coating configuration system 102 may communicate with client devices 106, 108, and 110 and manufacturing system 114 via network interface 116. Processor 118 may be or include an ASIC, one or more FPGAs, a DSP, circuits containing one or more processing components, circuitry for supporting a microprocessor, a group of processing components, or other suitable electronic processing components. In some embodiments, processor 118 may execute computer code or modules (e.g., executable code, object code, source code, script code, machine code, etc.) stored in memory 120 to facilitate the activities described herein. Memory 120 may be any volatile or non-volatile computer-readable storage medium capable of storing data or computer code.

Memory 120 may include a blockchain maintainer 122, a document selector 124, document hash generator 126, frequency selector 128, frequency hash generator 130, certificate generator 132, a seal coating configurator 134, a document database 136, and a frequency database 138. In brief overview, components 122-138 may cooperate to store curated authentication documents for different pieces of artwork. Components 122-138 may generate hashes of each of the documents and store the hashes with the documents to indicate the hashes correspond to the individual documents. Components 122-138 may then select a light wave frequency for each of the pieces of artwork and calculate a hash for each light wave frequency. Components 122-138 may append a block instance that includes the hashes to a blockchain with an indication of the piece of artwork that corresponds to the authentication documents and the light wave frequency. For each piece of artwork, components 122-138 may generate a configuration for a seal coating such that the seal coating is only visible if a light having the selected light wave frequency is directed at the seal coating. Components 122-138 may then transmit instructions to manufacturing system 114 to cause manufacturing system 114 to apply a seal coating to a certificate containing the hashes of the authentication documents and the artwork itself, thus linking the authentication documents and the artwork together. As described herein, the terms hash and hash code are used interchangeably.

Blockchain maintainer 122 may comprise programmable instructions that, upon execution, cause processor 118 to maintain a blockchain that stores pointers for artwork authentication data. The systems and methods described herein may be used with blockchain and/or with any other distributed ledger system (e.g., hashgraph, DAG, Holochain, Tempo (Radix), etc.). In embodiments in which the distributed ledger is a blockchain, the blockchain may contain linked block instances where each block instance contains data for a different piece of artwork. For example, one block instance may contain hash values that operate as pointers to different authentication documents for a specific piece of artwork. The same block instance may contain an identification string for the piece of artwork and an identification of a light wave frequency or a hash of the light wave frequency that points to the light wave frequency in a database. As different pieces of artwork are created and authenticated, block instances may continuously be appended to the blockchain. In this way, coating configuration system 102 may maintain an immutable record of authentication documents for different pieces of artwork.

Document selector 124 may comprise programmable instructions that, upon execution, cause processor 118 to select documents to include in a certificate to authenticate a piece of artwork. Document selector 124 may obtain one or more documents for a piece of artwork. The piece of artwork may be any type of artwork (e.g., a painting, a statue, a sculpture, a architecture, etc.). The documents may be authentication documents for the piece of artwork such as invoices, documents verifying the artwork's authenticity after an inspection by an authenticator, declarations from the artwork's artist, etc. Such documents may contain text describing or verifying the artwork's authenticity and/or photographs of the piece of artwork. In some embodiments, document selector 124 may obtain the one or more documents when a user scans or takes a photograph of the documents at a computing device and the computing device then uploads the documents to document database 136 (e.g., a relational database that stores authentication documents, hashes of such documents, and identifications of the artwork that the authentication documents authenticate) stored within coating configuration system 102. For example, document selector 124 may provision (e.g., transmit) a computer program to a computing device that includes instructions that cause the computer to generate a user interface at the computing device (e.g., in a software-as-a-service environment, as a website, or as a standalone piece of software). Document selector 124 may receive such documents and store the documents in document database 136.

Document selector 124 may upload the documents to a data room. The data room may be a virtual data room that operates as a document repository that is accessible to specific user accounts. For example, document selector 124 may send invitations to electronic accounts of different user accounts that are stored in a database (e.g., a database within coating configuration system 102). Such user accounts may be associated with different account permissions that correspond to whether they can view or participate in reviewing authentication documents for different pieces of artwork. Upon uploading the documents to the data room, document selector 124 may transmit a message to the electronic accounts that have viewing and/or reviewing permissions to access the data room to view the authentication documents for the piece of artwork.

Document selector 124 may determine if a document from the data room satisfies selection criteria. The selection criteria can be one or more rules and/or thresholds that indicate whether a document can be used to indicate a piece of artwork is authentic. Document selector 124 may determine if a document satisfies selection criteria based on the inputs from the different users that have access to the data room for the corresponding piece of artwork. For example, at the user interface of the data room, users can view and inspect (e.g., highlight, zoom in on, etc.) the different documents that have been uploaded for the piece of artwork. The users can then submit an indication (e.g., an upvote or a downvote, a binary value, etc.) of whether they believe the respective documents are authentic and/or accurately indicate that the piece of artwork is authentic. Document selector 124 can receive the indications for a document and evaluate the indications against selection criteria to determine whether the documents authenticate the piece of artwork.

The selection criteria can include a variety of different rules and/or thresholds. In one example, the selection criteria can include an upvote threshold where the selection criteria is satisfied if document selector 124 receives enough upvotes to satisfy the upvote threshold. In such an example, document selector 124 may maintain a counter for the document and increment the counter for each upvote document selector 124 receives. For each upvote or after receiving votes from all of the accounts that have access to the data room, document selector 124 may compare the count of the counter to the upvote threshold. If the count exceeds the threshold, the document selector 124 may determine the selection criteria is satisfied. If the count does not exceed the threshold, document selector 124 may wait for another upvote or, if all of the accounts have submitted their votes, determine the selection criteria is not satisfied for the document. In another example, the selection criteria can include rules that are satisfied if particular users indicate the document is authentic. For instance, document selector 124 may determine the selection criteria is satisfied if User A indicates a document is authentic. Such rules may be used in addition to or instead of the upvote threshold as described above to account for users that are particularly trusted (e.g., users that have authenticated a number of documents above a threshold or that have been manually designated by an operator of coating configuration system 102). In another example, the selection criteria can include a weighted upvote threshold. For instance, document selector 124 may assign weights to the different authenticating users that are submitting their votes such as based on the number of documents the users accounts have reviewed or based on manually input weight. Document selector 124 may aggregate the upvotes (and, in some cases, subtract the downvotes) according to the weights and compare the aggregated or total upvotes to the weighted upvote threshold. Document selector 124 may determine the selection criteria is satisfied responsive to the aggregated upvotes exceeding the weighted upvote threshold. Document selector 124 may determine the selection criteria is satisfied based on any other rules.

In another example of verifying an authentication document, the authentication results from the verification of the document with whom is legally entitled to authenticate the document. For example, the owner/collector of a piece of artwork may have an invoice from an auctioning entity (e.g., an auctioning company) that attests that the owner/collector bought the piece of artwork in 2015 from the auctioning entity. Document selector 124 may identify a legally entitled person within the auctioning entity's company (e.g., the verifier) and provide the identified person with access permissions to the data room. In some cases, the verifier may only be able to see the document for that specific piece of artwork in the data room. The verifier may receive an e-mail to access and create a password and view the document and to ensure the document matches the auctioning entity's internal records. If the document matches, the verifier may select a "verified" button to verify (e.g., upvote) the authentication document for the piece of artwork.

In some embodiments, document selector 124 may determine the selection criteria is satisfied only after all of or a portion of the above-described rules are satisfied. If the document is found to not satisfy the selection criteria, document selector 124 may discard the document (e.g., remove the document from document database 136 or assign a flag or setting to the document in document database 136 to indicate the document did not satisfy the selection criteria).

Responsive to determining the selection criteria is satisfied for a document, however, document selector 124 may select the document. Document selector 124 may select the document by identifying the document and storing the document in document database 136. In some embodiments, document selector 124 store the document in document database 136 with an identifier that indicates the document has been selected to be used to authenticate the piece of artwork.

Document selector 124 may determine if the document is the last unanalyzed document in the data room for the piece of artwork. For example, document selector 124 may query the data room to determine if there are any other documents in the data room for which document selector 124 has not determined if the documents satisfy the selection criteria. If document selector 124 determines there are one or more further documents in the data room, document selector 124 may iteratively repeat operations 408-412 until document selector 124 determines all of the documents in the data room have been evaluated.

Document hash generator 126 may comprise programmable instructions that, upon execution, cause processor 118 to generate hashes of authentication documentation for individual pieces of artwork. Document hash generator 126 may generate a document hash for each of the selected documents. For example, document hash generator 126 may retrieve each of the documents for the piece of artwork based on the documents being associated with the identifier of the piece of artwork in document database 136 and/or a setting or flag that indicates the documents have been selected. Document hash generator 126 may then use object recognition techniques and/or natural language processing techniques to extract the words from the documents. Document hash generator 126 may then concatenate the extracted words of the documents together to create a separate string of text for each of the documents. Document hash generator 126 may use a hashing function (e.g., SHA-2, SHA-128, SHA-256, etc.) on each of the strings of text to generate document hashes for the documents. Document hash generator 126 may store the document hashes and associations between the document hashes and the documents in document database 136.

Document hash generator 126 may generate a merkle tree from the document hashes. For example, document hash generator 126 may assign the different document hashes into a plurality of subgroups of hashes. Each subgroup of hashes may contain two or more hashes. For each subgroup of hashes, document hash generator 126 may concatenate the hashes of the subgroup and calculate a hash based on the concatenated hashes to obtain a document subgroup hash. Document hash generator 126 may then concatenate the document subgroup hashes into a single concatenated document subgroup hash and calculate a hash of the concatenated document subgroup hash to obtain a master hash of the documents in a merkle tree. Document hash generator 126 may create any number of layers of the hashes when creating the merkle tree. For example, document hash generator 126 may create a first set of hashes based on subgroups of document hashes, create new groups of hashes based on the first set of hashes and calculate hashes for each of the new groups, and repeat the process any number of times until document hash generator 126 creates a master document hash for the piece of artwork. In some embodiments, document hash generator 126 may create the subgroups of hashes using a predetermined number of hashes (e.g., two hashes) such that the number of hashes corresponds to the number of documents that were selected from the data room. Document hash generator 126 may store all of the hashes of the merkle tree, block hashes of different categories of documents, and/or the master hash of the merkle tree in document database 136 with associations with an identification of the artwork and the documents from which the hashes were generated.

In some embodiments, document hash generator 126 may generate the sets of hashes based on the categories of the documents from which the hashes were generated. For instance, documents may be separated into different categories that indicate different characteristics about the artwork (e.g., ownership, provenance, value, etc.). Identifiers of the categories that are associated with the documents may be stored in the database with associations with the documents and/or the hashes for the documents. Document hash generator 126 may separate the hashes into different categories based on the category identifiers to generate sets of documents and generate hashes of the different sets. In this way, document hash generator 126 may organize the hashes and generate a layer of a merkle tree.

In some embodiments, by generating hashes for different categories, document hash generator 126 may satisfy the criteria of a smart contract on a blockchain. For instance, a smart contract on a blockchain may include executable code with conditions that may be satisfied based on the hash codes that document hash generator 126 generates. Such conditions may be or include generating document hash codes for a predetermined number of documents from each of a predetermined number of categories, generating document hashes for documents in a predetermined number of categories, generating document hashes for a predetermined number of documents, generating documents for a predetermined number of documents, etc. Document hash generator 126 may generate such hashes until the conditions of a smart contract are satisfied. Once a smart contract is satisfied, hash generator 126 may change a stored status of an identifier of the piece of artwork to "Certified" to indicate verified documents have authenticated the piece of artwork.

Frequency selector 128 may comprise programmable instructions that, upon execution, cause processor 118 to select frequencies to use to configure a seal coating to place on the piece of artwork. Frequency selector 128 may identify an entity identifier that is associated with the piece of artwork. The entity identifier may be an identification of the person, business, or organization that owns or that is purchasing the piece of artwork. Frequency selector 128 may identify the identifier from frequency database 138 (e.g., a database that stores light frequencies, hashes of such light frequencies, and/or identifications of pieces of artwork that to which the light frequencies correspond) or from a user input from a user that is attempting to authenticate the piece of artwork. For example, frequency selector 128 may receive an input indicating that Acme Co. is purchasing or owns the piece of artwork. Frequency selector 128 may identify the input as the entity identifier that is associated with the piece of artwork.

Frequency selector 128 may select a light wave frequency based on the entity identifier. In some embodiments, the light wave frequencies correspond to frequencies in the red color spectrum (e.g., 400-484 THz). Advantageously, generating light at red frequencies may use less power than generating light at higher frequencies such as frequencies in the orange or yellow range. However, the light wave frequency may be any frequency and may be any fractional frequency. Frequency selector 128 may select the light wave from the same database in which the documents and/or the document hashes are stored (e.g., document database 136) or from a separate database (e.g., frequency database 138). Frequency selector 128 may select the light wave by using the entity identifier in a look-up in the database and identifying the light wave frequency that has a stored association with the entity identifier.

Frequency hash generator 130 may comprise programmable instructions that, upon execution, cause processor 118 to generate or calculate hashes of the light wave frequencies. Frequency hash generator 130 may generate a frequency hash of the selected light wave frequency. Frequency hash generator 130 may generate the frequency hash using similar hashing techniques to those described herein. Frequency hash generator 130 may generate the frequency hash based only on the numerical value of the frequency and/or text that describes the frequency (e.g., "THz"). In some embodiments, frequency hash generator 130 may store the frequency hash in the same database as the database in which the frequencies are stored.

Blockchain maintainer 122 may append a block instance to the blockchain.

Blockchain maintainer 122 may append the block instance to the blockchain such that the block instance contains the frequency hash and the document hashes that were calculated for the piece of artwork. In some embodiments, blockchain maintainer 122 may include an identifier of the piece of artwork in the block instance to indicate the document hashes and the frequency hash all correspond to the piece of artwork. In some embodiments, blockchain maintainer 122 may store the hashes of the merkle tree in the block instance to organize the different hashes together. In some embodiments, to minimize the data that is in the block instance, blockchain maintainer 122 may only store the master hash and/or the block hashes of the different groups or subgroups of documents hashes of the merkle tree in the block instance with the frequency hash and/or the identifier of the piece of artwork. In such embodiments, the master hash and/or the block hashes may operate as pointers to document database 136 where the master hash and/or the block hashes point to the documents that were used to calculate the master hash and/or the block hashes. Blockchain maintainer 122 may generate a block address for the block instance by concatenating the data stored in the block instance with the hash of the previous block in the blockchain. Thus, blockchain maintainer 122 may store an immutable record of the piece of artwork, the documents that authenticate the artwork, and light wave frequency that corresponds to the piece of artwork in a single block instance.

By appending the block instance with the hashes for the documents to the blockchain, blockchain maintainer 122 certifies that the authentication documents are authentic (e.g., the documents have been verified by a verifier). In doing so, blockchain maintainer 122 may create a smart contract on the blockchain in which a user can check the authenticity of the piece of artwork and the authentication documents for the piece of artwork. For example, a user may check the verification of authentication documents by inputting hash codes or block hash codes of the documents into a computer or scanning documents into the computer and the computer computes hashes codes or block codes of the scanned documents. Blockchain maintainer 122 may check the input hash codes against the hash codes of the smart contract by executing the smart contract. If the hash codes match, the smart contract may output a "certified" or "verified and certified" indication to show that the authentication documents match. Otherwise, the smart contract may output a "not verified" indication to indicate the hash codes do not match and therefore the documents are not authentic or have been tampered with. By creating block instances and/or smart contracts in this manner, artwork can be verified and certified to indicate the artwork is authentic. This authenticity can be checked over time against the blockchain to give artwork collectors confidence in the authenticity designation.

In some embodiments, blockchain maintainer 122 generates the identifier for the piece of artwork. Blockchain maintainer 122 may generate the identifier for the piece of artwork by generating two random four digit sequences (e.g., xxxx-yyyy). In some embodiments, each sequence may be a Fibonacci number for increased security of the identifier, although the sequences may have any numbering scheme. In some instances, the first four digit sequence may correspond to a collector or owner of the piece of artwork. In such instances, blockchain maintainer 122 may identify an identifier of the collector or owner in a database and retrieve the four digit sequence for the collector or owner from the database. The second sequence may be specific to the piece of artwork. For example, blockchain maintainer 122 may be configured to generate a four digit Fibonacci number for the piece of artwork and assign the generated four digit Fibonacci number to the piece of artwork. Blockchain maintainer 122 may store the identifier for the piece of artwork including both sequences in a database, in some instances with associations with the authentication documents for the piece of artwork. In this way, blockchain maintainer 122 may generate secure unique identifiers for the pieces of artwork.

Seal coating configurator 134 may comprise programmable instructions that, upon execution, cause processor 118 to generate a seal coating configuration based on the light wave frequency. The seal coating configuration may be a configuration for a gold nanoparticle coating that can only be seen if a light with a specific frequency is directed at the coating. For example, seal coating configurator 134 may create a configuration for a gold nanoparticle coating by creating a template file with a size, shape, and/or local refractive index for gold nanoparticles. Seal coating configurator 134 may store vectors that contain values for such data that are each associated with different frequencies in frequency database 138 such that seal coating configurator 134 may create the template by selecting the vector that is associated with specific light wave frequencies. Seal coating configurator 134 may identify the light wave frequency that was selected for the piece of artwork and generate a seal coating configuration from the vector that has a stored association with the light wave frequency.

Certificate generator 132 may comprise programmable instructions that, upon execution, cause processor 118 to generate a certificate from the document hashes. The certificate may be a physical certificate that includes the document hashes that are stored in the block instance for the piece of artwork. The physical certificate may be a piece of paper or another cellulose-based product. Certificate generator 132 may generate the certificate by retrieving the document hashes from the block instance and generating a text file with the document hashes. In embodiments in which only the master hash of a merkle tree is stored in the block instance, certificate generator 132 may identify the document hashes from document database 136 that correspond to the master hash (e.g., were used to generate the master hash) and retrieve the identified document hashes. Certificate generator 132 may then transmit the text file to a printer to print out a physical copy of the certificate.

In some embodiments, the certificate may include data other than the document hashes. For example, the certificate may also include the identifier of the piece of artwork that is stored on the block instance. In another example, the certificate may include an image of the piece of artwork. Certificate generator 132 may include such information in the certificate to make it clear which piece of artwork the certificate and the corresponding documents are authenticating to an individual viewing the certificate.

In some embodiments, certificate generator 132 may additionally generate a digital copy of the certificate. The digital certificate may be a text or another type of file that includes the same information as is on the physical copy of the certificate. In such embodiments, certificate generator 132 may include a scannable code (e.g., a QR code) on the physical copy of the certificate that, upon being scanned, causes certificate generator 132 to transmit a matching electronic copy of the certificate to the device that scanned the code. Certificate generator 132 may include the different hashes of the documents as links to the scanned copies of the documents in document database such that a user viewing the electronic version of the certificate can select the links to view the selected authentication documents. In some embodiments, the hashes may appear next to text names of the documents as strings that indicate the documents that correspond to the hashes.

Seal coating configurator 134 may transmit instructions to manufacturing system 140 to apply a seal having the generating seal coating configuration to the certificate and the piece of artwork. Seal coating configurator 134 may transmit such instructions across network 112 to a computing device within manufacturing system 140. The computing device that receives the instructions may control a seal coating device to apply a seal coating to the certificate and the piece of artwork that has the specified configuration. The seal coating device may be a stamping device or another computing device that is configured to create seal coatings according to specifications of the seal coating configuration that seal coating configurator 134 generated. In some embodiments, an individual accessing the computing device may view the seal coating configuration at the computing device and manually configure a device to apply the seal coating to the certificate and/or piece of artwork.

In some embodiments, manufacturing system 140 may generate or print the certificate. For example, seal coating configurator 134 may include an electronic text file 142 of the certificate that certificate generator 132 generated in the instructions that seal coating configurator 134 transmits to manufacturing system 140. The computing device may receive text file 142 and print a physical copy of the text file to print a certificate for the piece of artwork (e.g., piece of artwork 146).

The computing device may receive the instructions and apply a seal coating 148 to the piece of artwork and the certificate according to the seal coating configuration that is included in the instructions. For example, the computing device may receive the instructions and cause the seal coating device to generate a gold nanoparticle coating that has the specified size, shape, and/or local refractive index that seal coating configurator 134 specified in the seal coating configuration. The seal coating device may use a series of sifters and shredders to obtain gold nanoparticles according to the specifications. The seal coating device may then place the seal coating on a front face or a back face of certificate 144, at a location where there is not any text on the certificate. The seal coating device may apply a seal coating with the same configuration to piece of artwork 146. In an example, if the artwork is a painting, the seal coating device may apply the seal coating on a back portion of the frame in which the artwork is positioned or on the back of the canvas of the painting. If the artwork is a statue, the seal coating device may apply the seal coating anywhere on the statute. The seal coating device may apply the seal coating on any portion of any piece of artwork.

In some embodiments, the seal coating device may apply the seal coating on the artwork and certificate as a logo or a signature. The logo or signature may be the logo or signature of the entity that owns or is purchasing the artwork or any other logo or signature. The seal coating device may be preconfigured to apply the seal coating in this pattern, or the pattern may be included in the instructions that coating configuration system 102 sends to the seal coating device.

In some embodiments, to apply the seal coating to the certificate and/or the piece of artwork, the seal coating device may apply the seal coating to a clear and reusable sticky label (e.g., apply the seal coating to a label via pad printing techniques). The label may be configured such that it is visible on the certificate and/or the piece of artwork and sticks to the piece of artwork and/or certificate without introducing any new chemicals that could ruin the foundation of artwork or certificate. The seal coating device may apply the seal coating to two of such labels and the labels may be placed on the certificate and artwork to link the two together and certify their authenticity.

In some embodiments, the entity wishing to verify the authenticity of the piece of artwork may wish to further verify the authenticity of the authentication documents themselves. In such instances, the entity may scan a scannable code (e.g., a QR code) on the certificate to generate a digital copy of the certificate on the computer that receives the results of the scan. The entity may select any of the hashes of the certificate from the digital copy of the certificate. In response to the selection, coating configuration system may retrieve a copy of the document that corresponds to the selected hash and transmit the document to the computer. The user may select any of the hashes to view the authentication documents that authenticate the piece of artwork. Thus, entities may use a combination of the certificate and the seal coatings to confirm the artwork is authentic and know the data has not been tampered with or that the combination is not a replica of a real piece of artwork that happens to have the matching seal coatings based on the data being stored on the blockchain and in the off-chain database(s).

Figure 2:
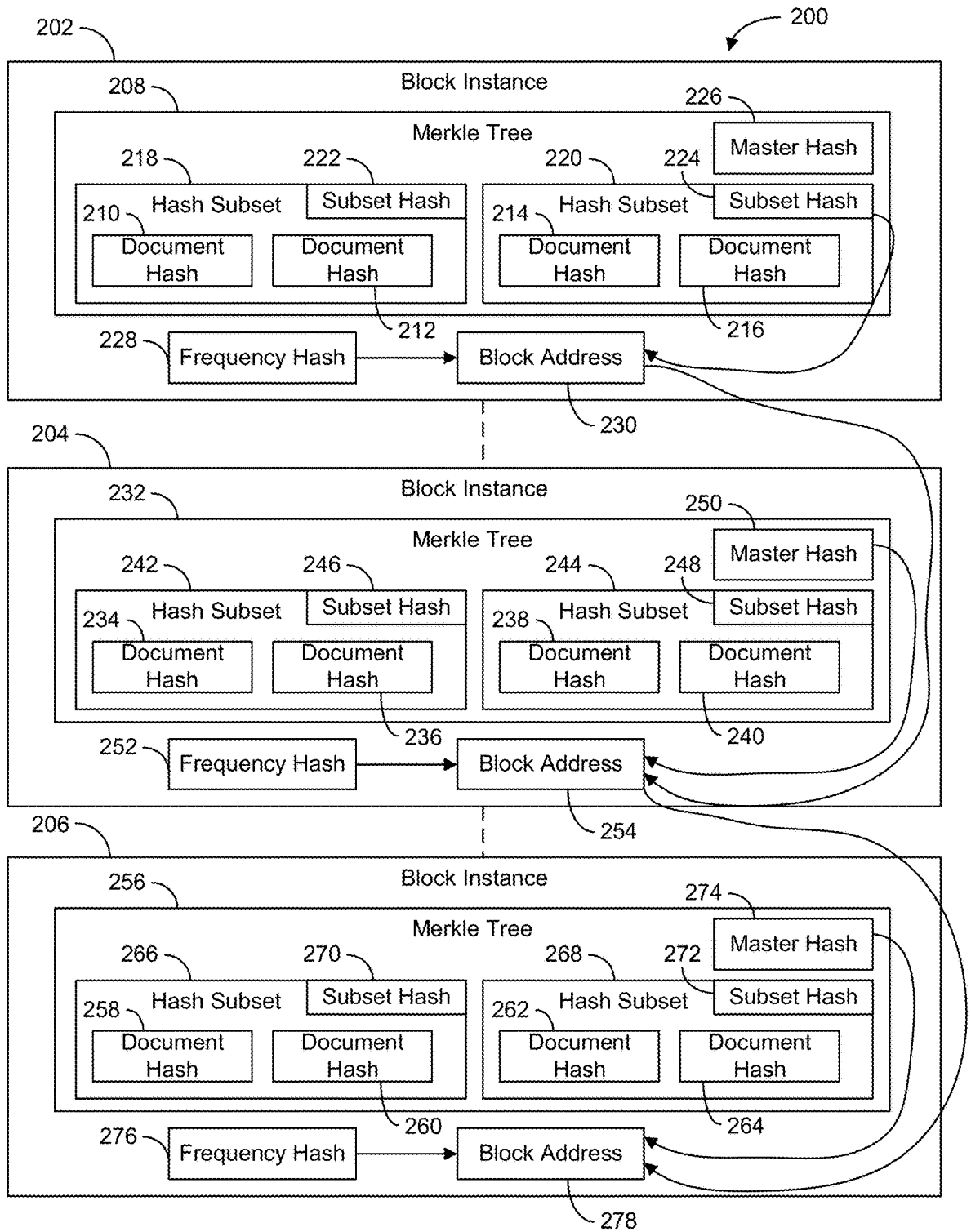
FIG. 2 is an illustration of a blockchain configured for artwork authentication, in accordance with some embodiments.

FIG. 2 is an illustration of a blockchain 200 for artwork authentication, in accordance with some embodiments. Blockchain 200 may maintained by a data processing system (e.g., coating configuration system 102) and multiple computing devices. Such computing devices may be operated by entities that own or purchase artwork. Blockchain 200 may be generated as the data processing system and the computing devices reach a quorum on the data that is in blockchain and that should be included in the new block instance. For example, when appending a new block to blockchain 200, the data processing system may transmit the data for the new block to the other computing devices that maintain blockchain 200 (e.g., store local copies of blockchain 200). Upon receiving the data for the new block instance, the computing devices and the data processing system may recalculate the data hash values for each block instance of blockchain 200. The values may be compared and, if enough block instances have matching data to satisfy a quorum (e.g., a majority or a number above a threshold), the data processing system may confirm the data has not been tampered with and append the new block to blockchain 200.

Blockchain 200 may contain block instances 202, 204, and 206 and any number of block instances. Each block instance of blockchain 200 may include data for a different piece of artwork such as data identifying the authentication documents for the artwork, data identifying the light wave frequencies that can be used to view coated seals on the artwork, and/or identifications of the artwork itself. For example, block instance 202 may contain a merkle tree 208 of document hashes 210, 212, 214, and 216 of authentication documents for a piece of artwork. The data processing system may organize document hashes 210, 212, 214, and 216 into hash subsets 218 and 220 by calculating a subset hash 222 based on document hashes 210 and 212 (e.g., based on a concatenation of document hashes 210 and 212) and a subset hash 224 based on document hash 214 and document hash 216. The data processing system may then calculate master hash 228 based on the subset hash 222 and subset hash 224. In some embodiments, the data processing system may only include master hash 228 of the hashes in block instance 202 to minimize the amount of data that is stored in block instance 202. The data processing system may also include a frequency hash 230 in block instance 202. Frequency hash 230 which may be a hash of the light wave frequency of the piece of artwork that corresponds to block instance 202. In some embodiments, the data processing system may store the frequency itself instead of frequency hash 230 in the block instance 202 or store the frequency in an off-chain database. In some embodiments, block instance 202 may also include an identifier (e.g., a string identifier) of the piece of artwork that corresponds to the block instance 202. The data processing system may calculate a block address 230 from the data of the block instance 202 and the previous block in blockchain 200.

Block instances 204 and 206 may be similar to block instance 202. For example, block instance 204 may contain a merkle tree 232, document hashes 234, 236, 238, and 240, hash subsets 242 and 244, and subset hashes 246 and 248. Block instance 204 may also include a master hash 250, a frequency hash 252, and a block address 254. In some embodiments, block instance 204 may also include an identification of the piece of artwork that corresponds to block instance 204. Block instance 206 may contain merkle tree 256, document hashes 258, 260, 262, and 264, hash subsets 266 and 268, and subset hashes 270 and 272. Block instance 206 may also include a master hash 274, a frequency hash 276, and a block address 278. In some embodiments, block instance 206 may also include an identification of the piece of artwork that corresponds to block instance 206.

Figure 3:
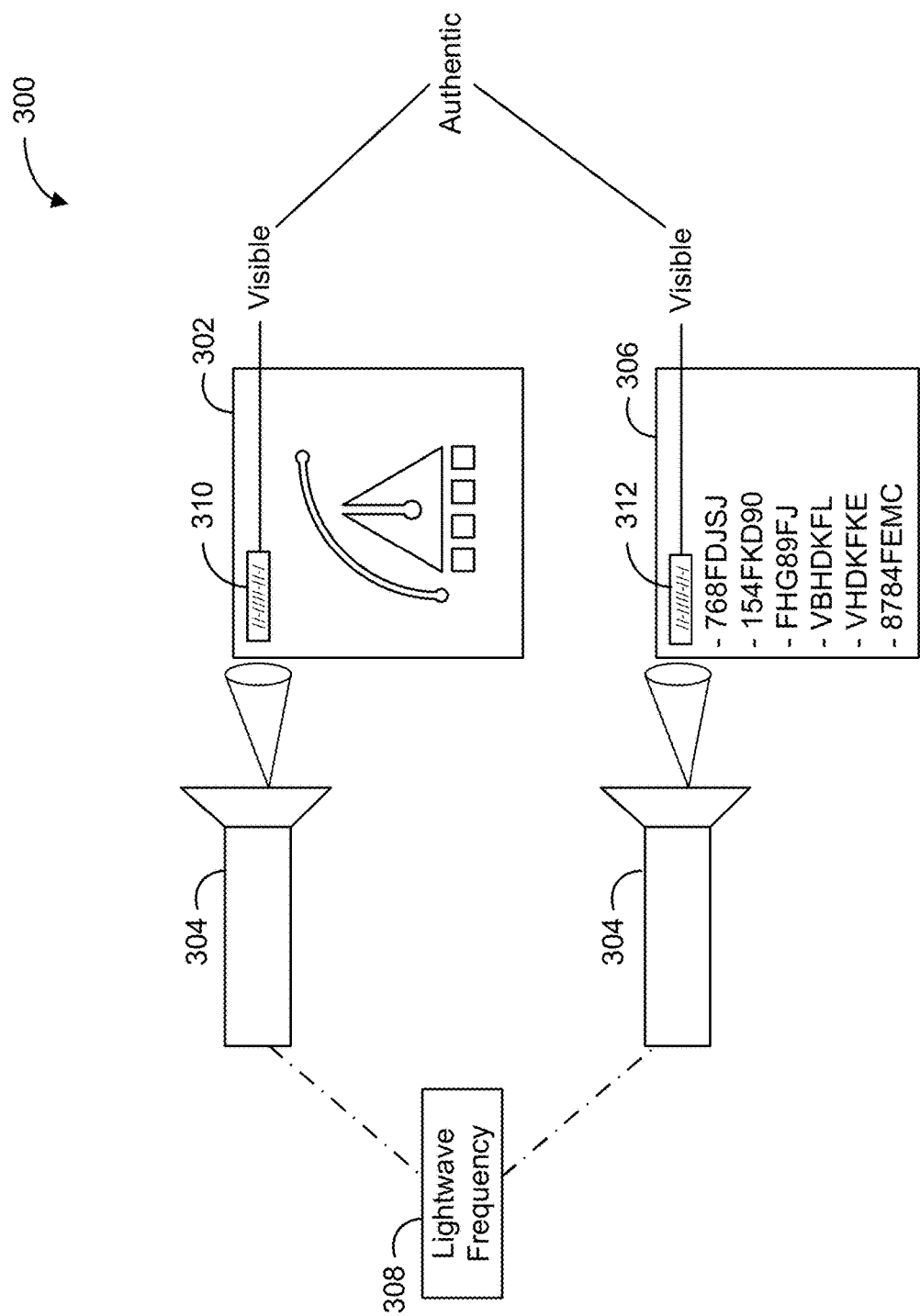
FIG. 3 is a sequence diagram of authenticating a piece of artwork, in accordance with some embodiments.

Referring now to FIG. 3, a sequence diagram 300 of authenticating a piece of artwork is shown, in accordance with some embodiments. Sequence diagram 300 includes an illustration of a user authenticating a piece of artwork 302 by directing a light 304 at artwork 302 and a certificate 306 that was generated for artwork 302 using the systems and methods described herein. For example, a user may configure or obtain a light 304 (e.g., a flashlight) to shine a light with a light wave frequency 308. The user may have obtained light wave frequency 308 when the user obtained artwork 302 or by requesting the light wave frequency from a data processing system that linked artwork 302 and certificate 306. The user may direct light 304 at specific portions of artwork 302 and certificate 306. If seal coating 310 on artwork 302 and seal coating 312 on certificate 306 both become visible when light 304 is directed at them, the user can confirm that artwork 302 has been authenticated. If only one of seal coating 310 and 312 appears when the light is directed at the two items, the user can determine artwork 302 is likely a counterfeit or artwork 302 or certificate 306 corresponds to a different piece of certificate or artwork. If neither of seal coating 310 or 312 appear when the light is directed at them, the user can determine the artwork is either a counterfeit or that another light wave frequency is needed to authenticate artwork 302.

Figure 4:
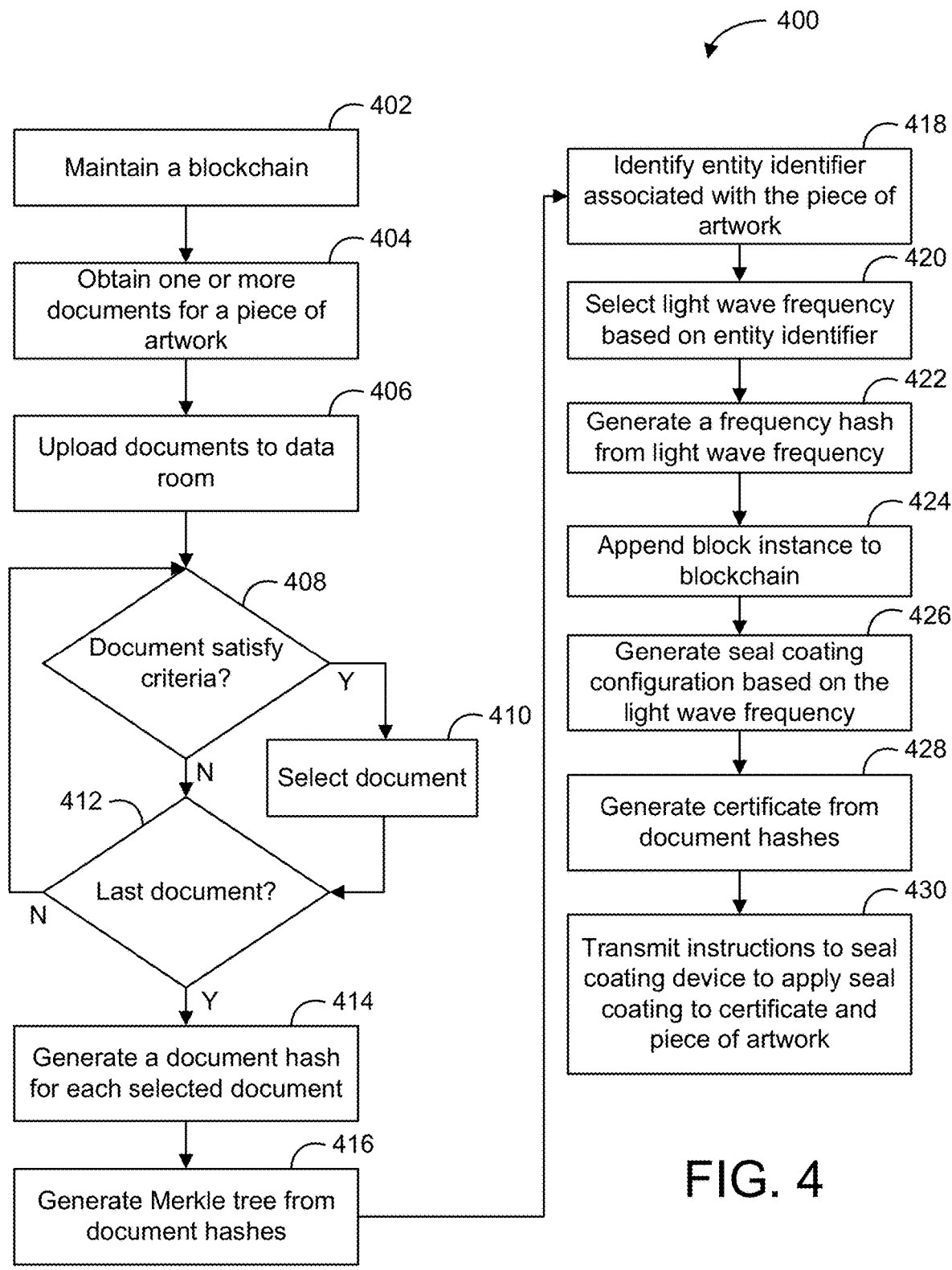
FIG. 4 is an example method for artwork authentication using blockchain, in accordance with some embodiments.

Referring now to FIG. 4, an example method 400 for artwork authentication using blockchain is shown, in accordance with some embodiments. Method 400 can be performed by a data processing system (a client device or a coating configuration system 102, shown and described with reference to FIG. 1, a server system, etc.). Method 400 may include more or fewer operations and the operations may be performed in any order. Performance of method 400 may enable the data processing system to link artwork authentication documents with their corresponding pieces of artwork using blockchain technology, in some embodiments. For example, the data processing system may obtain authentication documents for a piece of artwork. The data processing system may then electronically store the documents and calculate hashes of the documents for storage on a blockchain. The data processing system may store a hash of a light wave frequency in the same block instance as the document hashes. The data processing system may generate a physical certificate that contains the document hashes. The data processing system may also generate a seal coating configuration for a seal coating such that the seal coating is only visible if a light having a light wave frequency identified in the block instance is directed to the seal coating. The data processing system may transmit instructions to a seal coating device to cause the seal coating device to place a seal coating having such a configuration on the piece of artwork and the corresponding certificate. In this way, the data processing system may link the authentication documents and the piece of artwork together.

At operation 402, the data processing system maintains a blockchain. The blockchain may contain linked block instances where each block instance contains data for different pieces of artwork. For example, one block instance may contain hash values that operate as pointers to different authentication documents for a specific piece of artwork. The same block instance may contain an identification string for the piece of artwork and an identification of a light wave frequency or a hash of the light wave frequency that points to the light wave frequency in a database. As different pieces of artwork are created and authenticated, block instances may continuously be appended to the blockchain. In this way, the data processing system may maintain an immutable record of authentication documents for different pieces of artwork.

At operation 404, the data processing system obtains one or more documents for a piece of artwork. The piece of artwork may be any type of artwork (e.g., a painting, a statue, a sculpture, an architecture, etc.). The documents may be authentication documents for the piece of artwork such as invoices, documents verifying the artwork's authenticity after an inspection by an authenticator, declarations from the artwork's artist, etc. Such documents may contain text describing or verifying the artwork's authenticity and/or photographs of the piece of artwork. In some embodiments, the data processing system may obtain the one or more documents when a user scans or takes a photograph of the documents at a computing device and the computing device then uploads the documents to a database stored within the data processing system. For example, the data processing system may provision (e.g., transmit) a computer program to a computing device that includes instructions that cause the computer to generate a user interface at the computing device (e.g., in a software-as-a-service environment, as a website, or as a standalone piece of software). The data processing system may receive such documents and store the documents in a database (e.g., document database 136, shown and described with reference to FIG. 1).

At operation 406, the data processing system uploads the documents to a data room. The data room may be a virtual data room that operates as a document repository that is accessible to specific user accounts. For example, the data processing system may send invitations to electronic accounts of different user accounts that are stored in a database. Such user accounts may be associated with different account permissions that correspond to whether they can view or participate in reviewing authentication documents for different pieces of artwork. Upon uploading the documents to the data room, the data processing system may transmit a message to the electronic accounts that have viewing and/or reviewing permissions to access the data room to view the authentication documents for the piece of artwork.

In another example of verifying an authentication document, the authentication results from the verification of the entire documental set with whom is legally entitled to confirm. For example, the owner/collector of a piece of artwork may have an invoice from an auctioning entity (e.g., an auctioning company) that attests that the owner/collector bought the piece of artwork in 2015 from the auctioning entity. The data processing system may identify a legally entitled person within the auctioning entity's company (e.g., the verifier) and provide the identified person with access permissions to the data room. In some cases, the verifier may only be able to see the document for that specific piece of artwork in the data room (e.g., the data processing system may configure the verifier's account to have permissions that only let the verifier view artwork that the verifier has been invited to view). The verifier may receive an e-mail to access and create a password and view the document and to ensure the document matches the auctioning entity's internal records. If the document matches, the verifier may select a "verified" button to verify the authentication document for the piece of artwork.

At operation 408, the data processing system determines if a document from the data room satisfies selection criteria. The selection criteria can be one or more rules and/or thresholds that indicate whether a document can be used to indicate a piece of artwork is authentic. The data processing system may determine if a document satisfies selection criteria based on the inputs from the different users that have access to the data room for the corresponding piece of artwork. For example, at the user interface of the data room, users can view and inspect (e.g., highlight, zoom in on, etc.) the different documents that have been uploaded for the piece of artwork. The users can then submit an indication (e.g., an upvote or a downvote, a binary value, etc.) of whether they believe the respective documents are authentic and/or accurately indicate that the piece of artwork is authentic. The data processing system can receive the indications for a document and evaluate the indications against selection criteria to determine whether the documents authenticate the piece of artwork.

The selection criteria can include a variety of different rules and/or thresholds. In one example, the selection criteria can include an upvote threshold where the selection criteria is satisfied if the data processing system receives enough upvotes to satisfy the upvote threshold. In such an example, the data processing system may maintain a counter for the document and increment the counter for each upvote the data processing system receives. For each upvote or after receiving votes from all of the accounts that have access to the data room, the data processing system may compare the count of the counter to the upvote threshold. If the count exceeds the threshold, the data processing system may determine the selection criteria is satisfied. If the count does not exceed the threshold, the data processing system may wait for another upvote or, if all of the accounts have submitted their votes, determine the selection criteria is not satisfied for the document. In another example, the selection criteria can include rules that are satisfied if particular users indicate the document is authentic. For instance, the data processing system may determine the selection criteria is satisfied if User A indicates a document is authentic. Such rules may be used in addition to or instead of the upvote threshold as described above to account for users that are particularly trusted (e.g., users that have authenticated a number of documents above a threshold or that have been manually designated by an operator of the data processing system). In another example, the selection criteria can include a weighted upvote threshold. For instance, the data processing system may assign weights to the different authenticating users that are submitting their votes such as based on the number of documents the users accounts have reviewed or based on manually input weight. The data processing system may aggregate the upvotes (and, in some cases, subtract the downvotes) according to the weights and compare the aggregated or total upvotes to the weighted upvote threshold. The data processing system may determine the selection criteria is satisfied responsive to the aggregated upvotes exceeding the weighted upvote threshold. The data processing system may determine the selection criteria is satisfied based on any other rules. In some embodiments, the data processing system may determine the selection criteria is satisfied only after all of or a portion of the above-described rules are satisfied. If the document is found to not satisfy the selection criteria, the data processing system may discard the document (e.g., remove the document from the database or assign a flag or setting to the document in the database to indicate the document did not satisfy the selection criteria).

Responsive to determining the selection criteria is satisfied for a document, however, at operation 410, the data processing system selects the document. The data processing system may select the document by identifying the document and storing the document in a database. In some embodiments, the data processing system store the document in the database with an identifier that indicates the document has been selected to be used to authenticate the piece of artwork.

At operation 412, the data processing system determines if the document is the last unanalyzed document in the data room for the piece of artwork. For example, the data processing system may query the data room to determine if there are any other documents in the data room for which the data processing system has not determined if the documents satisfy the selection criteria. If the data processing system determines there are one or more further documents in the data room, the data processing system may iteratively repeat operations 408-412 until the data processing system determines all of the documents in the data room have been evaluated.

At operation 414, the data processing system generates a document hash for each of the selected documents. For example, the data processing system may retrieve each of the documents for the piece of artwork based on the documents being associated with the identifier of the piece of artwork in the database and/or a setting or flag that indicates the documents have been selected. The data processing system may then use object recognition techniques and/or natural language processing techniques to extract the words from the documents. The data processing system may then concatenate the extracted words of the documents together to create a separate string of text for each of the documents. The data processing system may use a hashing function (e.g., SHA-2, SHA-128, SHA-256, etc.) on each of the strings of text to generate document hashes for the documents. The data processing system may store the document hashes and associations between the document hashes and the documents in the database.

At operation 416, the data processing system generates a merkle tree from the document hashes. For example, the data processing system may assign the different document hashes into a plurality of subgroups of hashes. Each subgroup of hashes may contain two or more hashes. For each subgroup of hashes, the data processing system may concatenate the hashes of the subgroup and calculate a hash based on the concatenated hashes to obtain a document subgroup hash (or a document block hash). The data processing system may then concatenate the document subgroup hashes into a single concatenated document subgroup hash and calculate a hash of the concatenated document subgroup hash to obtain a master hash of the documents in a merkle tree. The data processing system may create any number of layers of the hashes when creating the merkle tree. For example, the data processing system may create a first set of hashes based on subgroups of document hashes, create new groups of hashes based on the first set of hashes and calculate hashes for each of the new groups, and repeat the process any number of times until the data processing system creates a master document hash for the piece of artwork. In some embodiments, the data processing system may create the subgroups of hashes using a predetermined number of hashes (e.g., two hashes) such that the number of hashes corresponds to the number of documents that were selected from the data room. The data processing system may store all of the hashes of the merkle tree, the block hashes for the individual groups or subgroups of document hashes, and/or just the master hash of the merkle tree in the database with associations with an identification of the artwork and the documents from which the hashes were generated.

In some embodiments, the data processing system may generate the sets of hashes based on the categories of the documents from which the hashes were generated. For instance, documents may be separated into different categories that indicate different characteristics about the artwork (e.g., ownership, provenance, value, etc.). Identifiers of the categories that are associated with the documents may be stored in the database with associations with the documents and/or the hashes for the documents. The data processing system may separate the hashes into different categories based on the category identifiers to generate sets of documents and generate block hashes of the different sets. In this way, the data processing system may organize the hashes and generate a layer of a merkle tree.

In some embodiments, by generating hashes for different categories, the data processing system may satisfy the criteria of a smart contract on a blockchain. For instance, a smart contract on a blockchain may include executable code with conditions that may be satisfied based on the hash codes that document hash generator 126 generates. Such conditions may be or include generating document hashes for a predetermined number of documents from each of a predetermined number of categories, generating document hashes for documents in a predetermined number of categories, generating document hashes for a predetermined number of documents, etc. The data processing system may generate such hashes until the conditions of a smart contract are satisfied. Once a smart contract is satisfied, the data processing system may change a stored status of an identifier of the piece of artwork to "Certified" to indicate verified documents have authenticated the piece of artwork. At operation 418, the data processing system may identify an entity identifier that is associated with the piece of artwork. The entity identifier may be an identification of the person, business, or organization that owns or that is purchasing the piece of artwork. The data processing system may identify the identifier from the database or from a user input from a user that is attempting to authenticate the piece of artwork. For example, the data processing system may receive an input indicating that Acme Co. is purchasing or owns the piece of artwork. The data processing system may identify the input as the entity identifier that is associated with the piece of artwork.

At operation 420, the data processing system selects a light wave frequency based on the entity identifier. In some embodiments, the light wave frequencies correspond to frequencies in the red color spectrum (e.g., 400-484 THz). Advantageously, generating light at such frequencies may use less power and may enable more fine-grained control of the frequencies that can be used (e.g., fractional frequencies may be used) than generating light at higher frequencies such as frequencies in the orange or yellow range. However, the light wave frequency may be any frequency. The data processing system may select the light wave from the same database in which the documents and/or the document hashes are stored or from a separate database (e.g., frequency database 138). The data processing system may select the light wave by using the entity identifier in a look-up in the database and identifying the light wave frequency that has a stored association with the entity identifier.

At operation 422, the data processing system generates a frequency hash of the selected light wave frequency. The data processing system may generate the frequency hash using similar hashing techniques to those described herein. The data processing system may generate the frequency hash based only on the numerical value of the frequency and/or text that describes the frequency (e.g., "THz"). In some embodiments, the data processing system may store the frequency hash in the same database as the database in which the frequencies are stored.

At operation 424, the data processing system appends a block instance to the blockchain. The data processing system may append the block instance to the blockchain such that the block instance contains the frequency hash and the document hashes that were calculated for the piece of artwork. In some embodiments, the data processing system may include an identifier of the piece of artwork in the block instance to indicate the document hashes and the frequency hash all correspond to the piece of artwork. In some embodiments, the data processing system may store the hashes of the merkle tree in the block instance to organize the different hashes together. In some embodiments, to minimize the data that is in the block instance, the data processing system may only store the master hash and/or the block hashes of the different groups or subgroups of documents hashes of the merkle tree in the block instance with the frequency hash and/or the identifier of the piece of artwork. In such embodiments, the master hash and/or the block hashes may operate as pointers to the database that stores the documents where the master hash and/or block hashes point to the documents that were used to calculate the master hash and/or block hashes. The data processing system may generate a block address for the block instance by concatenating the data stored in the block instance with the hash of the previous block in the blockchain. Thus, the data processing system may store an immutable record of the piece of artwork, the documents that authenticate the artwork, and light wave frequency that corresponds to the piece of artwork in a single block instance.

By appending the block instance with the hashes for the documents to the blockchain, the data processing system certifies that the authentication documents are authentic (e.g., the documents have been verified by a verifier). In doing so, the data processing system may create a smart contract on the blockchain in which a user can check the authenticity of the piece of artwork and the authentication documents for the piece of artwork. For example, a user may check the verification of authentication documents by inputting hash codes or block hash codes of the documents into a computer. The data processing system may check the input hash codes against the hash codes of the smart contract by executing the smart contract. If the hash codes match, the smart contract may output a "certified" or "verified and certified" indication to show that the authentication documents match. Otherwise, the smart contract may output a "not verified" indication to indicate the hash codes do not match and therefore the documents are not authentic or have been tampered with. By creating block instances and/or smart contracts in this manner, artwork can be verified and certified to indicate the artwork is authentic. This authenticity can be checked over time against the blockchain to give artwork collectors confidence in the authenticity designation.

In some embodiments, the data processing system generates the identifier for the piece of artwork. The data processing system may generate the identifier for the piece of artwork by generating two random four digit sequences (e.g., xxxx-yyyy). In some embodiments, each sequence may be a Fibonacci number for increased security of the identifier, although the sequences may have any numbering scheme. In some instances, the first four digit sequence may correspond to a collector or owner of the piece of artwork. In such instances, the data processing system may identify an identifier of the collector or owner in a database and retrieve the four digit sequence for the collector or owner from the database. The second sequence may be specific to the piece of artwork. For example, the data processing system may be configured to generate a four digit Fibonacci number for the piece of artwork and assign the generated four digit Fibonacci number to the piece of artwork. The data processing system may store the identifier for the piece of artwork including both sequences in a database, in some instances with associations with the authentication documents for the piece of artwork. In this way, the data processing system may generate secure unique identifiers for the pieces of artwork.

At operation 426, the data processing system generates a seal coating configuration based on the light wave frequency. The seal coating configuration may be a configuration for a gold nanoparticle coating that can only be seen if a light with a specific frequency is directed at the coating. For example, the data processing system may create a configuration for a gold nanoparticle coating by creating a template file with a size, shape, and/or local refractive index for gold nanoparticles. The data processing system may store vectors that contain values for such data that are each associated with different frequencies such that the data processing system may create the template by selecting the vector that is associated with specific light wave frequencies. The data processing system may identify the light wave frequency that was selected for the piece of artwork and generate a seal coating configuration from the vector that has a stored association with the light wave frequency. In some embodiments, the seal coating includes paint, chemicals and solvents. The combination of the paint, chemicals and solvents may give the result of activation only at a defined frequency of light (e.g., red light frequencies). Specific entities may be associated with specific fractional frequencies, as described above.

At operation 428, the data processing system generates a certificate from the document hashes. The certificate may be a physical certificate that includes the document hashes that are stored in the block instance for the piece of artwork. The physical certificate may be a piece of paper or another cellulose-based product. The data processing system may generate the certificate by retrieving the document hashes from the block instance and generating a text file with the document hashes. In embodiments in which only the master hash of a merkle tree is stored in the block instance, the data processing system may identify the document hashes from the database that correspond to the master hash or document block hashes (e.g., were used to generate the master hash or document block hashes) and retrieve the identified document hashes. The data processing system may then transmit the text file to a printer to print out a physical copy (e.g., a paper copy) of the certificate.

In some embodiments, the certificate may include data other than the document hashes. For example, the certificate may also include the identifier of the piece of artwork that is stored on the block instance. In another example, the certificate may include an image of the piece of artwork. The data processing system may include such information in the certificate to make it clear which piece of artwork the certificate and the corresponding documents are authenticating to an individual viewing the certificate.

In some embodiments, the data processing system may additionally generate a digital copy of the certificate. The digital certificate may be a text or another type of file that includes the same information as is on the physical copy of the certificate. In such embodiments, the data processing system may include a scannable code (e.g., a QR code) on the physical copy of the certificate that, upon being scanned, causes the data processing system to transmit a matching electronic copy of the certificate to the device that scanned the code. The data processing system may include the different hashes of the documents as links to the scanned copies of the documents in the database such that a user viewing the electronic version of the certificate can select the links to view the selected authentication documents. In some embodiments, the hashes may appear next to text names of the documents as strings that indicate the documents that correspond to the hashes.

At operation 430, the data processing system transmits instructions to a seal coating device to apply a seal having the generating seal coating configuration to the certificate and the piece of artwork. The data processing system may transmit such instructions across a network. The seal coating device may be a stamping device or another computing device that is configured to create seal coatings according to specifications of the seal coating configuration that the data processing system generated.

The seal coating device may receive the instructions and apply a seal coating to the piece of artwork and the certificate according to the seal coating configuration that is included in the instructions. For example, the seal coating device may receive the instructions and generate a gold nanoparticle coating that has the specified size, shape, and/or local refractive index the data processing system specified in the seal coating configuration. The seal coating device may use a series of sifters and shredders to obtain gold nanoparticles according to the specifications. The seal coating device may then place the seal coating on a front face or a back face of the certificate, at a location where there is not any text on the certificate. The seal coating device may apply a seal coating with the same configuration to the piece of artwork. In an example, if the artwork is a painting, the seal coating device may apply the seal coating on a back portion of the frame in which the artwork is positioned or on the back of the canvas of the painting. If the artwork is a statue, the seal coating device may apply the seal coating anywhere on the statute. The seal coating device may apply the seal coating on any portion of any piece of artwork.

In some embodiments, the seal coating device may apply the seal coating on the artwork and certificate as a logo or a signature. The logo or signature may be the logo or signature of the entity that owns or is purchasing the artwork or any other logo or signature. The seal coating device may be preconfigured to apply the seal coating in this pattern or the pattern may be included in the instructions that the data processing system sends to the seal coating device.

In some embodiments, an entity may wish to verify the authenticity of the piece of artwork based on the certificate that the data processing system generated for the piece of artwork. To do so, the entity may need a copy of the certificate, the piece of artwork, and access to a light with a frequency that matches the frequencies that cause the seal coatings to become visible on the artwork and the certificate. The entity may access a computer to request the light wave frequency that corresponds to the piece of artwork. The request may include an identification of the piece of artwork. The data processing system may receive the request, identify the block instance from the blockchain that includes a matching value to the identification of the piece of artwork, and retrieve the frequency hash from the block instance. The data processing system may then retrieve the frequency from the database that stores light wave frequencies based on the frequency hash and transmit the frequency to the requesting computing device. The entity accessing the computing device may retrieve a light having the frequency and shine the light on the certificate and the piece of artwork. The entity may determine the artwork is authentic and/or that the artwork corresponds to the certificate based on the coated seal appearing on both the artwork and the certificate when the entity directs the light at the two items.

In some embodiments, the entity wishing to verify the authenticity of the piece of artwork may wish to further verify the authenticity of the authentication documents themselves. In such instances, the entity may scan a scannable code (e.g., a QR code) on the certificate to generate a digital copy of the certificate on the computer that receives the results of the scan. The entity may select any of the hashes of the certificate from the digital copy of the certificate. In response to the selection, the data processing system may retrieve a copy of the document that corresponds to the selected hash and transmit the document to the computer. The user may select any of the hashes to view the authentication documents that authenticate the piece of artwork. Thus, entities may use a combination of the certificate and the seal coatings to confirm the artwork is authentic and know the data has not been tampered with or that the combination is not a replica of a real piece of artwork that happens to have the matching seal coatings based on the data being stored on the blockchain and in the off-chain database(s).

In some embodiments, to apply the seal coating to the certificate and/or the piece of artwork, the seal coating device may apply the seal coating to a clear and reusable label (e.g., apply the seal coating to a label via pad printing techniques). The label may be configured such that it is visible on the certificate and/or the piece of artwork and sticks to the piece of artwork and/or certificate without introducing any new chemicals that could ruin the foundation of the artwork or certificate. The seal coating device may apply the seal coating to two of such labels and the labels may be placed (by the seal coating device, an individual, or another device) on the certificate and artwork to link the two together and certify their authenticity.

In some embodiments, the data processing system may use the data room that was described above to sell or expose artwork for different art collectors. For example, an artwork collector that owns 20 pieces of artwork that have been authenticated using the systems and methods described herein may desire to sell/expose a subset of the collection. To do so, via the data processing system, the artwork collector may create a gallery within the data room and upload one or more of the 20 pieces of artwork to the gallery (e.g., upload files containing images of the pieces of artwork and/or their corresponding authentication documents to the gallery). The artwork collector may do so by selecting the pieces of artwork from a stored list of pieces of artwork that the artwork collector owns that the data processing system has stored in memory. The artwork collector may give access to the gallery to selected individuals such that the individuals can visit the gallery and view the artwork as guests to the gallery. The data processing system may transmit invitations (e.g., emails) to the electronic accounts of the selected individuals. The guests may accept the invitation and establish connections with the data room. Via the connections, the guests may view and make offers to purchase the pieces of artwork in the gallery.

Figure 5:
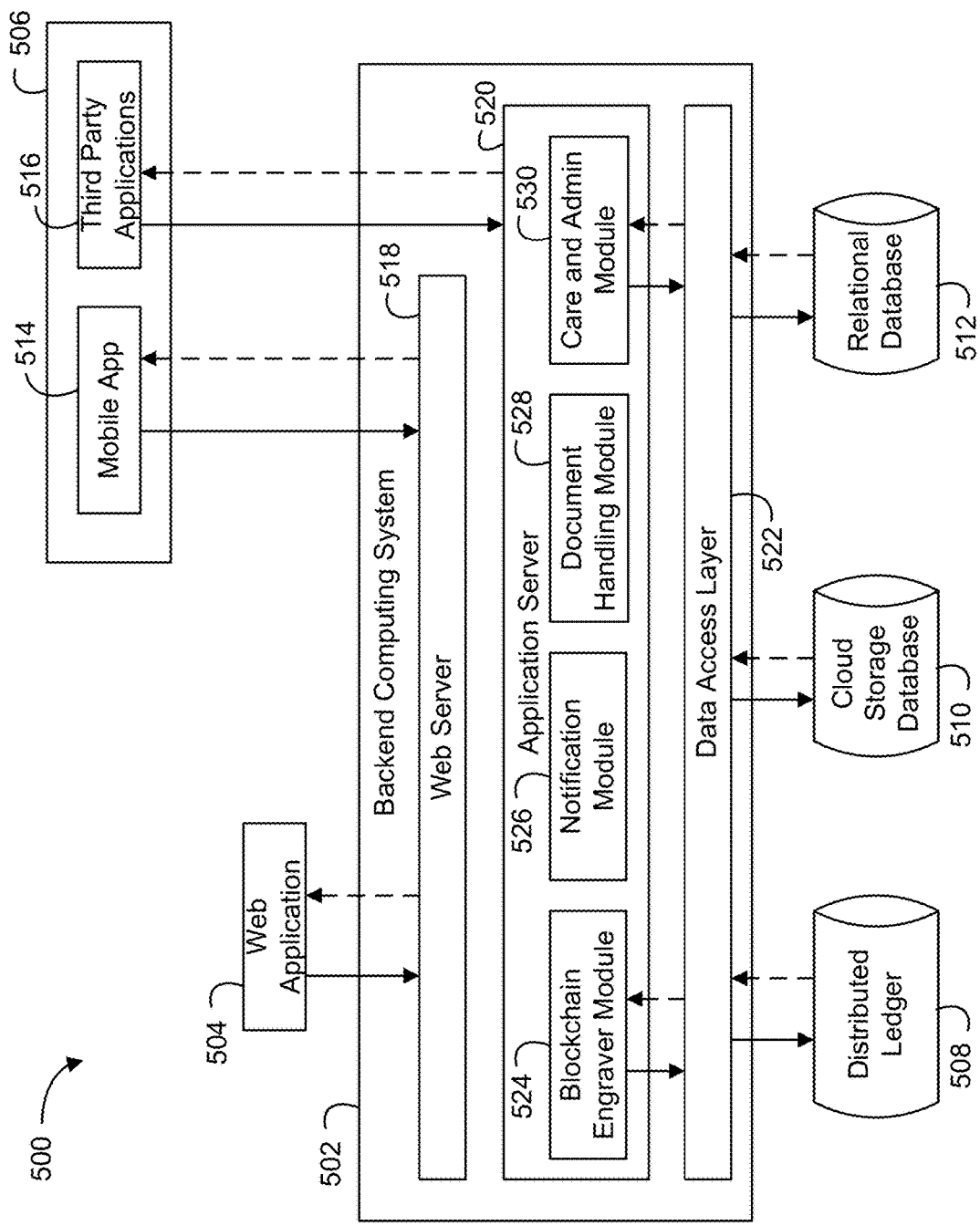
FIG. 5 is an illustration of an example system diagram for artwork authentication, in accordance with some embodiments.

Referring now to FIG. 5, an illustration of an example system diagram for artwork authentication is shown, in accordance with some embodiments. FIG. 5 is shown to include an artwork authentication system 500. Artwork authentication system 500 and/or the components therein may be similar to or the same as artwork authentication system 100 and/or the components of artwork authentication system 100, shown and described with reference to FIG. 1. Artwork authentication system 500 may include a backend computing system 502, a web application 504, applications 506, a distributed ledger 508, a cloud storage database 510, and a relational database 512. Backend computing system 502 may include a series of servers or computing layers that enable artwork authentication system 500 to manage authentication documents for various pieces of artwork. Web application 504 may be a web application (e.g., a browser) that can communication with back-end computing system 502 to upload authentication documents and/or identifications and/or pictures of pieces of artwork to backend computing system 502. Applications 506 may include mobile applications 514 and/or third-party applications 516 that can communicate with backend computing system 502 and transmit similar data to web application 504. Web application 504 and/or applications 506 may each be executed by a processor of a computing device.

Backend computing system 502 may include a web server 518, an application server 520, and a data access layer 522. Web server 518 may be a gateway server that enables backend computing system 502 to communicate with web application 504 and/or applications 506. Data access layer 522 is a layer of backend computing system 502 that can communicate with various data sources (e.g., retrieve data from the data sources). For example, data access layer 522 may request and/or retrieve data from distributed ledger 508, cloud storage database 510, and/or relational database 512 such that the data may be processed by application server 504. In some embodiments, data access layer 522 may also transmit data back to the data sources to update the data (e.g., data access layer 522 may transmit new data for a block instance to distributed ledger 508 to update distributed ledger 508).

Application server 520 may store one or more modules that operate to link pieces of artwork with authentication documents that respectively authenticate the artwork. For example, application server may store a blockchain engraver module 524, a notification module 526, a document handling module 528, and/or a core and admin module 530. Blockchain engraver module 524 may be configured to engrave document hashes in block instances of distributed ledger 508 that authenticate individual pieces of artwork. Notification module 526 may be configured to generate notifications that artwork has been authenticated. Document handling module 528 may be configured to calculate hashes of authentication document and store documents and/or their respective hashes in databases (e.g., cloud storage database 510 or relational database 512). Care and admin module 530 may be configured to manage modules 524-528 and provide access privileges to administrators to reconfigure modules 524-528.

Figure 6:
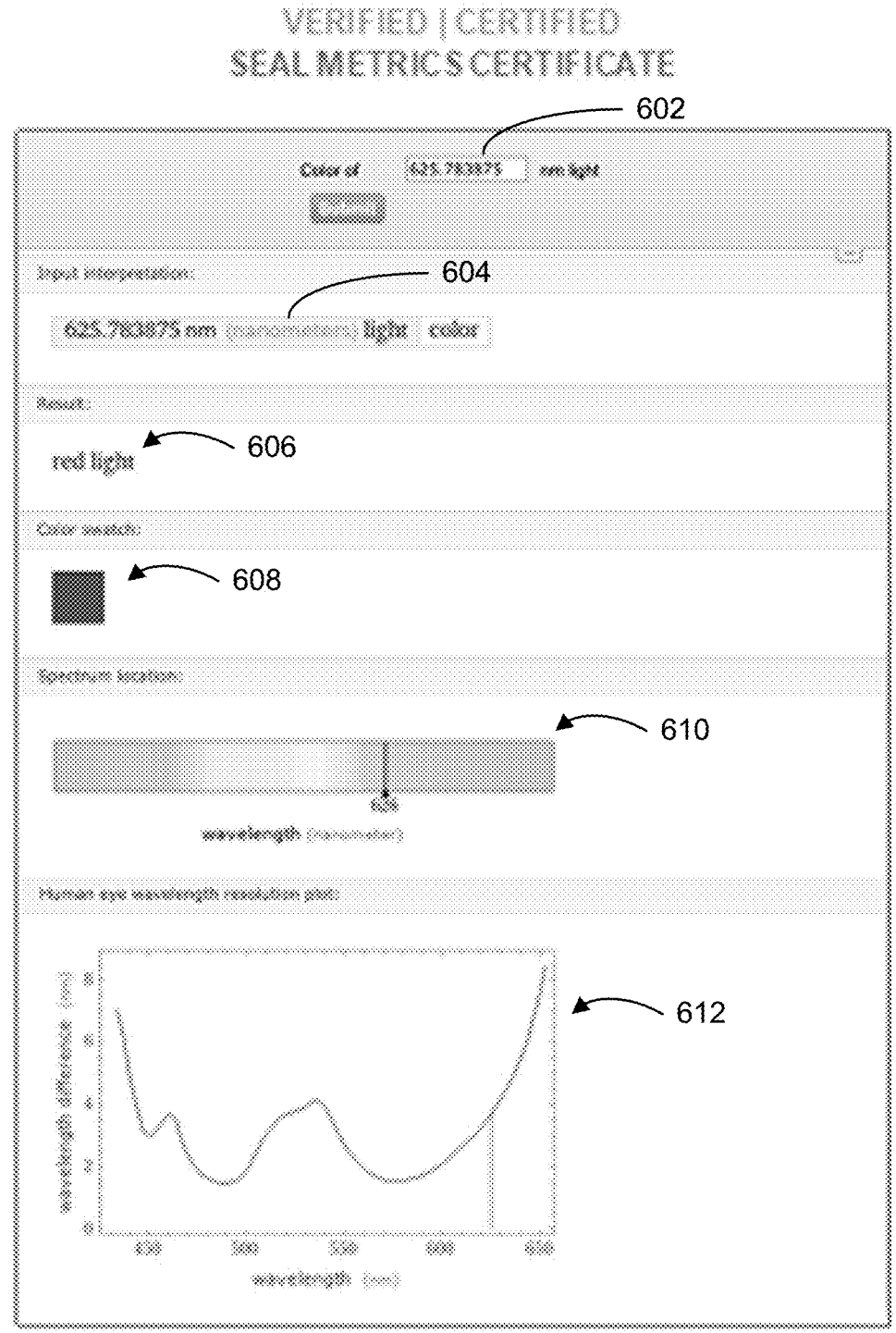
FIG. 6 is an example user interface for selecting a light wave frequency for artwork authentication, in accordance with some embodiments.

Referring now to FIG. 6, an example user interface 600 for selecting a light wave frequency for artwork authentication is, in accordance with some embodiments. User interface 600 includes a form 602 in which a user may input a light wave frequency (e.g., 625.783875 nm). Result 606 is a textual indicator of the color that matches that frequency (e.g., red light). Visual indicator 608 is a visual indicator of a color that matches the textual indicator of result 606. Spectrum 610 illustrates where the input wave length falls on the color spectrum. Plot 612 illustrates where the input wavelength is on a human eye wavelength resolution scale. After a piece of artwork and the artwork's corresponding authentication documents have been verified and certified (e.g., a block instance containing hashes of the authentication documents has been appended to a blockchain), a user may select light frequency using user interface 600 to use to link a certificate of the hashes of the documents with the artwork, as described herein. In some embodiments, the user may select the color using user interface 600 before engraving the document hashes in the block chain such that the light wave frequency of the color can be included in the block instance.

It is to be understood that any examples, values, graphs, tables, and/or data used herein are simply for purposes of explanation and are not intended to be limiting in any way. Further, although the present disclosure has been discussed with respect to dam monitoring, in other embodiments, the teachings of the present disclosure may be applied to similarly monitor other structures.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for linking authentication documents to a piece of artwork using blockchain, comprising:
    maintaining, by one or more processors, a blockchain with a plurality of computing devices;
    obtaining, by the one or more processors, one or more documents comprising data corresponding to a piece of artwork;
    generating, by the one or more processors, a document hash for each of the one or more documents based on text contained in the respective documents;
    generating, by the one or more processors, a frequency hash based on a light wave frequency;
    appending, by the one or more processors, a block instance to the blockchain by generating a block address based on the document hashes for the one or more documents, the frequency hash, and an identification of the piece of artwork; and
    transmitting, by the one or more processors, instructions to a seal coating device, receipt of the instructions causing the seal coating device to apply a seal coating to the piece of artwork and a certificate containing the document hashes for the one or more documents, the seal coating configured to appear only when light having the light wave frequency of the frequency hash is directed at the seal coating.

2. The method of claim 1, further comprising:
    receiving, by the one or more processors from a computing device, an authentication request comprising an identification of the piece of artwork;
    identifying, by the one or more processors, the appended block instance of the blockchain based on the identification of the piece of artwork;
    retrieving, by the one or more processors, the frequency hash from the appended block instance;
    retrieving, by the one or more processors, the light wave frequency from a database separate from the blockchain based on the frequency hash; and
    in response to receiving the authentication request, transmitting, by the one or more processors, the light wave frequency to the computing device.

3. The method of claim 1, wherein obtaining the one or more documents comprises:
    selecting, by the one or more processors, the one or more documents from a plurality of documents stored in an online database responsive to each of the one or more documents satisfying a selection criteria based on user inputs received from a plurality of computing devices.

4. The method of claim 1, further comprising:
    identifying, by the one or more processors, an identification of an external entity associated with the piece of artwork; and
    selecting, by the one or more processors, the light wave frequency for the piece of artwork based on the identification of the external entity.

5. The method of claim 1, further comprising:
    generating, by the one or more processors, a merkle tree based on the document hashes for the one or more documents,
    wherein generating the block address comprises generating, by the one or more processors, the block address based on the merkle tree.

6. The method of claim 5, wherein generating the merkle tree comprises generating a master document hash based on the document hashes for the one or more documents; and
    wherein generating the block address based on the document hashes for the one or more documents comprises generating the block address based on the master document hash.

7. The method of claim 1, further comprising generating, by the one or more processors, a digital certificate corresponding to the certificate, the digital certificate comprising a list of the document hashes for the one or more documents and an image of the piece of artwork.

8. The method of claim 7, further comprising:
    presenting, by the one or more processors over a network, the digital certificate on a display of a computing device;
    receiving, by the one or more processors from the computing device, a selection of a document hash from the list of the document hashes;
    identifying, by the one or more processors, a document of the one or more documents from a database based on the selected document hash, the selected document hash generated based on text from the document; and
    transmitting, by the one or more processors, a digital copy of the identified document to the computing device.

9. The method of claim 1, wherein appending the block instance to the blockchain comprises:
    concatenating, by the one or more processors, the document hashes for the one or more documents, the frequency hash, and the identification of the piece of artwork into a block identification string; and
    calculating, by the one or more processors, the block instance address by determining a hash of the block identification string.

10. The method of claim 1, further comprising:
scanning, by the one or more processors, the one or more documents into a database,
wherein generating the document hashes for the one or more documents comprises:
retrieving, by the one or more processors, the one or more scanned documents from the database;
extracting, by the one or more processors, scanned text from the one or more scanned documents; and
calculating, by the one or more processors, the document hashes for the one or more documents based on the extracted scanned text.

11. The method of claim 1, wherein the certificate comprises a piece of paper comprising a paper front face and a paper back face and the piece of artwork comprises a canvas comprising a canvas front face and a canvas back face, and wherein the seal coating device applies the seal coating to the piece of artwork by applying the seal coating to the canvas back face of the canvas and applying the seal coating to the certificate comprises applying the seal coating to the paper front face or the paper back face of the piece of paper.

12. A system for linking authentication documents to a piece of artwork using blockchain, comprising:
a processor coupled to a memory having programmed instructions, wherein upon executing the programmed instructions, the processor:
maintains a blockchain with a plurality of computing devices;
obtains one or more documents comprising data corresponding to a piece of artwork;
generates a document hash for each of the one or more documents based on text contained in the respective documents;
generates a frequency hash based on a light wave frequency;
appends a block instance to the blockchain by generating a block address based on the document hashes for the one or more documents, the frequency hash, and an identification of the piece of artwork; and
transmits instructions to a seal coating device, receipt of the instructions causing the seal coating device to apply a seal coating to the piece of artwork and a certificate containing the document hashes for the one or more documents, the seal coating configured to appear only when light having the light wave frequency of the frequency hash is directed at the seal coating.

13. The system of claim 12, wherein the execution of the programmed instructions further causes the processor to:
receive, from a computing device, an authentication request comprising an identification of the piece of artwork;
identify the appended block instance of the blockchain based on the identification of the piece of artwork;
retrieve the frequency hash from the appended block instance;
retrieve the light wave frequency from a database separate from the blockchain based on the frequency hash; and
in response to receiving the authentication request, transmit the light wave frequency to the computing device.

14. The system of claim 12, wherein the execution of the programmed instructions further causes the processor to obtain the one or more documents by:
selecting the one or more documents from a plurality of stored documents responsive to each of the one or more documents satisfying a selectin criteria based on user inputs received from a plurality of computing devices.

15. The system of claim 12, wherein the execution of the programmed instructions further causes the processor to:
identify an identification of an external entity associated with the piece of artwork; and
select the light wave frequency for the piece of artwork based on the identification of the external entity.

16. The system of claim 12, wherein the execution of the programmed instructions further causes the processor to:
generate a Merkle tree based on the document hashes for the one or more documents,
wherein the execution of the programmed instructions causes the processor to generate the block address generating the block address based on the Merkle tree.

17. The system of claim 16, wherein execution of the programmed instructions causes the processor to generate the Merkle tree by generating a master document hash based on the document hashes for the one or more documents; and
wherein execution of the programmed instructions causes the processor to generate the block address based on the document hashes for the one or more documents by generating the block address based on the master document hash.

18. The system of claim 12, wherein the execution of the programmed instructions further causes the processor to:
generate a digital certificate corresponding to the certificate, the digital certificate comprising a list of the document hashes for the one or more documents and an image of the piece of artwork.

19. A non-transitory computer-readable storage medium storing executable instructions that, when executed by one or more processors, causes the one or more processors to link authentication documents to a piece of artwork using blockchain, the instructions comprising instructions to:
maintain a blockchain with a plurality of computing devices;
obtain one or more documents comprising data corresponding to a piece of artwork;
generate a document hash for each of the one or more documents based on text contained in the respective documents;
generate a frequency hash based on a light wave frequency;
append a block instance to the blockchain by generating a block address based on the document hashes for the one or more documents, the frequency hash, and an identification of the piece of artwork; and
control a seal coating device to cause the seal coating device to apply a seal coating to the piece of artwork and a certificate containing the document hashes for the one or more documents, the seal coating configured to appear only when light having the light wave frequency of the frequency hash is directed at the seal coating.

20. The non-transitory computer-readable storage medium of claim 19, wherein the instructions further cause the processor to:
receive, from a computing device, an authentication request comprising an identification of the piece of artwork;
identify the appended block instance of the blockchain based on the identification of the piece of artwork;
retrieve the frequency hash from the appended block instance;
retrieve the light wave frequency from a database separate from the blockchain based on the frequency hash; and in response to receiving the authentication request, transmit the light wave frequency to the computing device.

\* \* \* \* \*